March 14, 1944. D. J. NEALE 2,344,051
CABLE CAR AND SPINNER ATTACHMENT
Filed Feb. 13, 1941 2 Sheets-Sheet 1
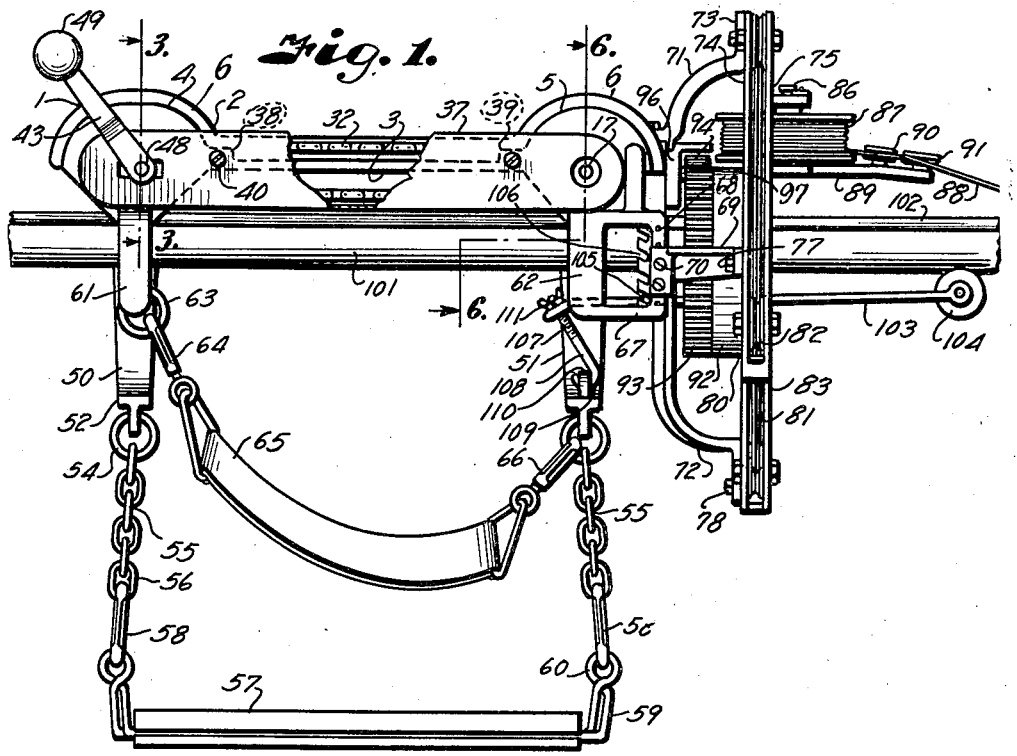
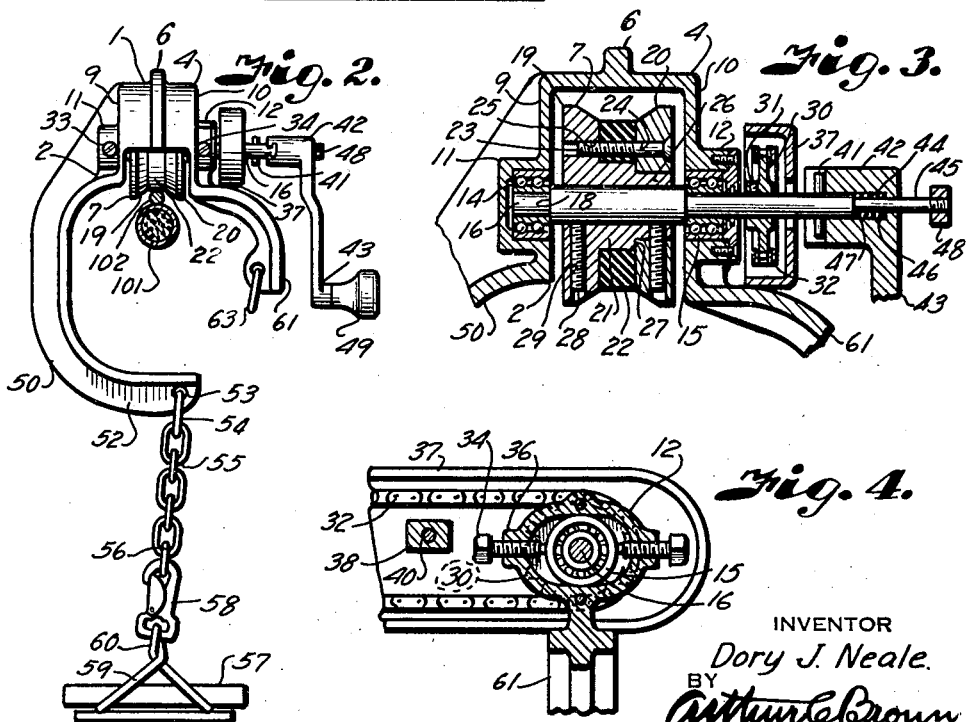
INVENTOR
Dory J. Neale.
BY Arthur C. Brown
ATTORNEY March 14, 1944. D. J. NEALE 2,344,051
CABLE CAR AND SPINNER ATTACHMENT
Filed Feb. 13, 1941 2 Sheets-Sheet 2
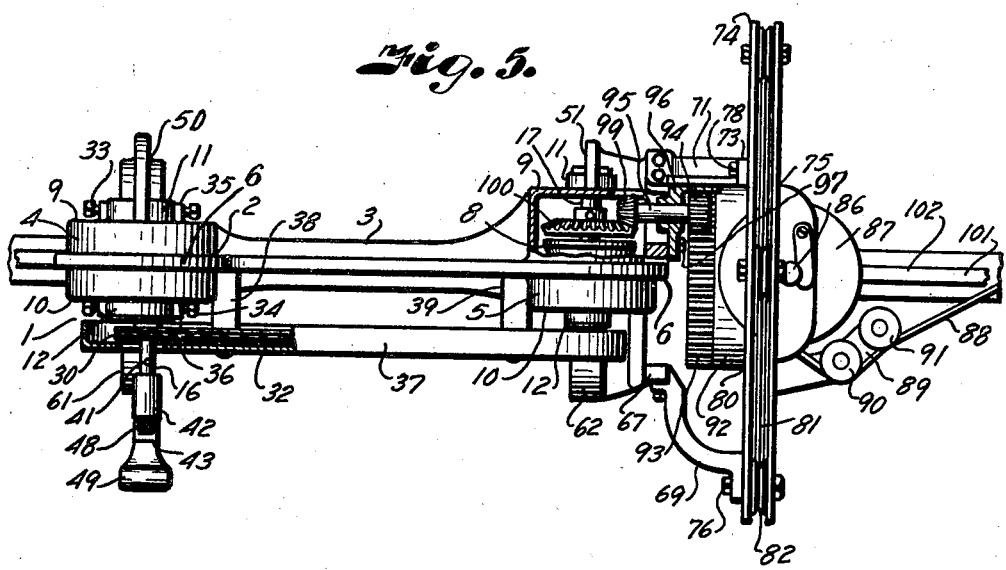
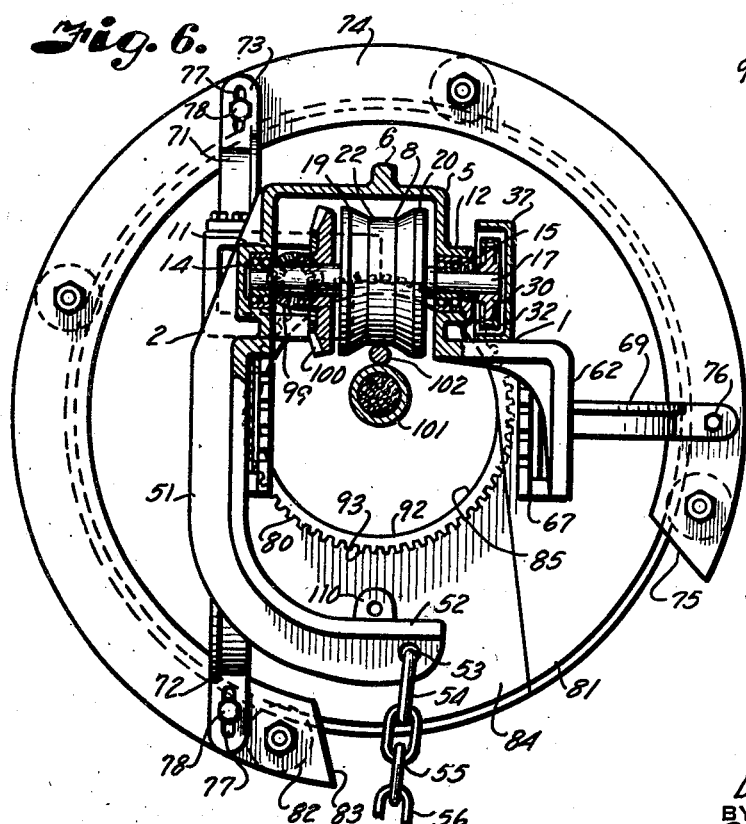
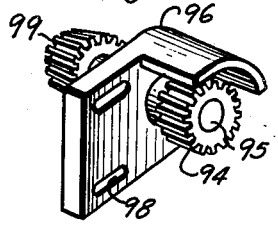
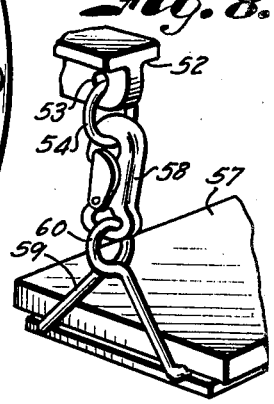
INVENTOR
Dory J. Neale.
BY
Arthur L. Brown
ATTORNEY Patented Mar. 14, 1944

2,344,051

UNITED STATES PATENT OFFICE 2,344,051

CABLE CAR AND SPINNER ATTACHMENT

Dory J. Neale, Topeka, Kans.

Application February 13, 1941, Serial No. 378,744

9 Claims. (Cl. 175—376)

This invention relates to a cable car such as used by a lineman in repairing and servicing cables supported by a messenger, and has for its principal object to provide a device of this character which is of strong, light weight, substantially balanced construction and adapted for convenient and safe operation.

Other objects of the invention are to provide a cable car with means for adjustably supporting a cable lashing mechanism; to provide the cable car with a sling seat having a greater range of adjustment; to provide a cable car having a one-piece frame construction including guards completely covering the traction rollers; to provide an adjustable drive between the car supporting rollers or wheels whereby both wheels provide motive traction on the messenger; and to provide a cable car having wheels which are kept in centered relation on the messenger and so that the car does not get out of balance when the wheels wear.

In accomplishing these and other objects of the invention, as hereinafter pointed out, I have provided improved details of structure, the preferred form of which is illustrated in the accompanying drawings, wherein:

Fig. 1 is an elevational view of a cable car constructed in accordance with the present invention and equipped with a cable lashing or spinning mechanism.

Fig. 2 is an end elevational view of the cable car.

Fig. 3 is an enlarged fragmentary cross-section through a portion of the cable car on the line 3—3 of Fig. 1.

Fig. 4 is a detail view illustrating adjustment of the flexible driving connection between the traction wheels.

Fig. 5 is a plan view of the cable car, parts being shown in section to better illustrate the construction.

Fig. 6 is a detail cross-section on the line 6—6 of Fig. 1.

Fig. 7 is a perspective view of the bracket and the driving gears for the spinning mechanism.

Fig. 8 is a fragmentary perspective view showing close adjustment of the lineman's seat relatively to the hanger brackets of the car.

Referring more in detail to the drawings:

1 designates a cable car constructed in accordance with the present invention, and which includes a unitary frame 2 comprising a longitudinal bar portion 3 of substantially cross-shaped section and carrying wheel housings 4 and 5 at the respective ends thereof. The housings 4 and 5 include arcuate wheel guard portions 6 of sufficient length to adequately cover the wheels 7 and 8. Each arcuate guard portion includes sides 9 and 10 having bosses 11 and 12 provided with bearing recesses. Mounted in the recesses are anti-friction bearings 14 and 15 journalling the reduced ends of shafts 16 and 17, the reduced ends forming annular shoulders 18 engaging the adjacent sides of the bearings to prevent longitudinal movement of the shafts with respect thereto.

The wheels 7 and 8 each includes flanges 19 and 20 having bevelled inner peripheries as shown in Fig. 3. The flange 19 includes a hub 21 mounting a traction ring 22 preferably formed of resilient material, such as rubber, and which is retained between the flanges by fastening devices, such as screws 23, extending through suitable openings 24 in the flange 20 and into aligning threaded sockets 25 in the flange 19. The flange 20 is preferably retained in centered position with respect to the flange 19 by a hub extension 26 engaging in a central opening of the flange 20. The hub extension is preferably of smaller diameter than the body of the hub 21 to form a stop shoulder 27 for the flange 20 when the fastening devices 23 are drawn tight, to limit distortion of the rubber ring. The rubber ring, however, is sufficiently supported so as to control depression of the messenger thereinto and to resist wear on the rubber which would normally throw the car out of balance.

The wheels thus described are affixed to their respective shafts by set-screws 28 extending through threaded openings 29 in the flanges with the ends thereof engaged against the shafts as shown in Fig. 3.

One end of each shaft extends through the recess at one side of the frame and carries a sprocket 30 which is fixed thereto by a set-screw 31. The sprockets are interconnected by a flexible chain 32, operating over the teeth thereof so that when one of the shafts is rotated, the other is also rotated. In order to adjust the tension of the chain, the recesses carrying the bearings which support the shaft 16 are preferably elongated, as shown in Fig. 4, so that the bearings may be shifted therein by pairs of set-screws 33 and 34 threaded through bosses 35 and 36 on the respective sides of each bearing so as to shift the bearings by slacking off one of the screws and tightening the other, as the case may require.

The chain thus described is enclosed in a guard 37 extending parallel with the bar portion 2 and supported therefrom by laterally extending lugs 38 and 39, the guard being affixed to the lugs by screws 40, or similar fastening devices. The shaft 16 projects through the guard and carries a cross-pin 41 adapted to be engaged by the slotted head 42 of a crank 43, the head of the lever being slidably supported on the shaft and normally urged away from the pin by a coil spring 44 sleeved upon a reduced extension 45 of the shaft and having one end bearing against the bottom of a socket 46 in the head and its opposite end against a shoulder 47 formed by the reduced extension 45. The head of the crank is retained from displacement by a stop 48, threaded on the terminal end of the shaft extension as shown in Fig. 3. The crank is provided on its free end with a handle or knob 49. It is thus obvious that when the crank is moved inwardly against action of the spring 44, the slotted head 42 is caused to engage the cross-pin 41, whereupon rotation of the crank 43 effects rotation of the wheel 7 and a corresponding rotation of the wheel 8 through the sprocket and chain connection. When pressure is released on the crank, the spring 44 automatically disengages the slotted head thereof from the cross-pin 41.

Projecting from the sides of the frame, opposite the crank, are outwardly and downwardly extending bracket arms 50 and 51 terminating in hook-like ends 52 extending beyond the tractional centers of the respective wheels. Formed in the ends 52 are openings 53 for rings 54 of securing chains 55, any link 56 of which may be connected with a seat 57 by safety snaps or hooks 58. The hooks 58 are carried by rod-like brackets 59 fixed to the seat and having eyes 60 arranged with the axial openings thereof parallel with the axes of the rings 54. With this arrangement, the snaps may be engaged directly with the rings 54 so as to provide an extremely close connection of the seat with respect to the messenger, if this is desired.

By observing Fig. 2 it will be noted that the attaching points of the flexible connections are offset relatively to the messenger on the side of the machine adjacent the crank so that the weight of the lineman will act to substantially balance the car on the messenger. Extending from the frame, opposite the arms 50 and 51, are outwardly and downwardly curved arms 61 and 62. The arm 61 carries a ring 63 to be engaged by a hook 64 at one end of a back-band 65, the hook 66 at the other end of the back-band being secured to the ring 54 which is connected to the bracket arm 51. Therefore the end of the back-band, at the crank end of the car, is supported at a higher elevation than the other end so as to more conveniently support the back of the lineman when he reaches under or over the messenger with his left arm, to operate the crank 43.

The arm 62 carries a lateral extension 67 having a plurality of vertically arranged apertures 68 for adjustably supporting a bracket 69, the bracket 69 being connected therewith by screws 70 extending through the bracket and into selected apertures.

The bracket 67 cooperates with upwardly and downwardly extending brackets 71 and 72 which are carried in fixed position at the opposite side of the frame as shown in Fig. 6. All of the brackets curve in the longitudinal direction of the car and terminate in ears 73 to mount a substantially circular frame 74 of a spinning or lashing mechanism 75. The bracket 69 is attached to the track by a fastening device, such as a cap-screw 76, and the track is supported in fixed relation therewith. The ears of the other brackets, however, have slots 77 through which the fastening devices 78 pass. The frame 74 carries a spinning head 80 including a rotatable plate-like ring 81 having its periphery supported by rollers 82 carried by the circular frame 74. The circular frame 74 has an opening 83 to permit removal of a gate portion 84 of the ring 81 so that the car may be applied to a messenger, with the messenger and cable extending through a central opening 85 of the ring as shown in Fig. 6, the gate being releasably retained in position by a suitable fastening means (not shown).

The ring 81 carries a spindle 86 adapted to support a spool 87 carrying a coil of wire 88 which is adapted to be spun around a cable and its supporting messenger, as later described, the spool carrying bracket being provided with an arm 89 mounting wire guide wheels 90 and 91 which are located in position to guide the wire spirally around the messenger and cable. The ring 81 also includes a hub 92 having teeth 93 thereon meshing with the teeth of a pinion gear 94 that is mounted on a counter-shaft 95 carried in a bracket 96, the bracket 96 being adjustably secured to the car frame by fastening devices 97 extending through slots 98 in the bracket and into threaded openings of the frame. The counter-shaft 95 carries a bevelled pinion gear 99 meshing with a bevelled gear 100 which is adjustably fixed to the shaft 17 and located in an extension of the wheel housing 5 as best shown in Fig. 6, there being sufficient room between the wheel 8 and the side of the housing to permit positioning of the gear on the shaft corresponding to any adjustment required of the circular track to maintain concentric relation of the spinning head and cable and to retain the teeth of the pinion 94 in proper meshing relation with the teeth 93 of the spinning head when an adjustment of the circular frame has been effected.

In order to raise the cable designated 101 into contact with the messenger 102, the car carries a cable-raising arm 103 having a grooved wheel 104 adapted to supportingly engage the under side of the cable 101, as shown in Fig. 1. The opposite end of the arm 103 carries a fulcrum 105 adapted to engage in one of a series of notches 106 carried on the bracket 62. The arm 103 projects beyond the fulcrum and is provided with an opening therein through which the threaded shank 107 of a J bolt 108 projects. The hooked end 109 of the J bolt is engaged in the aperture of an ear 110 carried by the bracket arm 51, previously described. The shank of the J bolt is provided with a wing-nut 111 whereby the wing-nut may be adjusted to fulcrum the cable raising arm 103 so that the wheel 104 thereof is retained in position to support the cable 101 in contact with the messenger 102.

In using the cable car equipped with the spinning head, the gate 84 of the spinning head 80 is removed and the circular frame 74 is adjusted on its supporting arm so that when the wheels of the car are engaged with the messenger, the spinning head will be supported in substantially concentric alignment with the cable 101. Upon adjusting the spinning head, it is necessary to adjust the gear 100 on the shaft 17 and the bracket 96 which carries the gears 94 and 99 so that the gears may be kept in meshing relation. After adjustment of the gears, the gear 100 is tightened on its shaft and the bracket 96 is rigidly secured in position by the fastening devices therefor.

The cable car is applied so that the wheels thereof track directly on the messenger. In applying the car to the messenger, the spinning head is moved so that the opening thereof is in alignment with the cut away portion of the circular frame, whereupon the spinning head may pass freely over the messenger and its cable. After placement of the car, the gate 84 is applied. The lineman may then take his position on the seat, with his back supported by the band 65. He then projects his left arm under the cable and through the space between the brackets 50 and 51 so that the crank 43 may be rotated to effect movement of the car along the messenger. When pressure is applied on the crank, it is moved into engagement with the cross-pin 41 so that when the crank is rotated the wheel 7 is rotated together with the wheel 8, both the wheels becoming traction wheels to effect movement of the car along the messenger. The cable raising arm 103 having been adjusted to raise the cable into contact with the messenger, the J bolt 108 is tightened to apply the proper tension on the arm. One end of the strand 88 on the spool 87 is loosened, extended over the guide wheel 90, wrapped once around the wheel 91, and then suitably attached adjacent the pole from where the spinning is to start.

After attachment of the strand, the lineman rotates the crank 43 to effect movement of the car along the messenger. Movement of the car causes unspooling of the strand, and rotation of the shaft 17 drives the gear 100, pinion 99, and gear 94 to effect rotation of the spinning head, whereby the wire strand is wrapped in a series of convolutions about the cable and messenger, securely lashing the cable thereto as the car is moved along the messenger. When the car has reached the next pole, the strand may be suitably anchored to retain the lashing, whereupon the car is moved to the opposite side of the pole and applied to the messenger as previously described.

Attention is particularly directed to the offset relation of the chains 55 with respect to the wheels of the car, so that the car is kept in substantial balance. The links 56 of the chains 55 provide for adjustment of the seat with respect to the cable so that the seat may be raised to any one of a plurality of positions. The different elevations for the hook connections of the back-band 65 are also important as they provide a more comfortable support for the back of the lineman when operating the propelling crank 43. The one-piece construction of the car frame also forms an important part of the invention in that it provides a strong, light weight construction and is not subject to disarrangement that may throw the car out of balance. It is also obvious that the car is well adapted for the attachment of the spinning head and the spinning head may be readily adjusted with respect to the car so that it is retained in concentric relation with the cable on which the car is used.

What I claim and desire to secure by Letters Patent is:

1. A device of the character described including, a frame, cable engaging wheels carried by the frame, a crank supported at one side of the frame and having rotative connection with at least one of said wheels, a seat suspended from the frame, a spinning mechanism having a spinning head, a gear on the spinning head, a counter-shaft adjustably supported on the frame, a gear on the counter-shaft meshing with the gear on the spinning head, a second gear on the counter-shaft, and means operatively connecting said second named gear with said crank.

2. A device of the character described including, a frame, wheels carried by the frame and adapted to operate upon a cable supporting strand, a spinning mechanism adjustably supported on the frame with an axis of rotation substantially concentric with the cable carried by the strand when the wheels engage said strand, a driving connection between the spinning mechanism and one of said wheels, and means for adjustably positioning said driving connection upon adjustment of the spinning mechanism on said frame.

3. A device of the character described including, a frame, spaced parallel shafts journalled on the frame, wheels fixed to said shafts, a gear slidably adjustable on one of said shafts, a counter-shaft having adjustable support on the frame, a gear on the counter-shaft meshing with said first named gear, a spinning mechanism adjustably supported on the frame, and a gear on the counter-shaft for actuating the spinning mechanism.

4. A device of the character described including, a frame, spaced parallel shafts journalled on the frame, wheels fixed to said shafts, a gear slidably adjustable on one of said shafts, a counter-shaft having adjustable support on the frame, a gear on the counter-shaft meshing with said first named gear, a spinning mechanism adjustably supported on the frame, a gear on the counter-shaft for actuating the spinning mechanism, a driving connection between said shafts, and a crank for rotating one of said shafts.

5. A device of the character described including, a frame, cable engaging wheels mounted on said frame, a cable raising arm, a series of fulcrum supporting seats on said frame, a fulcrum on the cable raising arm engageable with a selected seat, and screw-threaded means connecting the cable raising arm with the frame to move said arm on the fulcrum.

6. A device of the character described including a frame, wheels on the frame adapted to engage a cable-carrying strand, arms at one end of the frame and extending above and below the engaging point of said wheels with the cable-carrying strand, a circular track carried on said arms, a lateral arm extending from the frame and cooperating with the first named arms to support said track, means for adjustably attaching the arms to the frame for positioning the axis of said track relatively to the cable carrying strand on which the device is to be mounted, a spinning head carried by said track, a driving connection between the spinning head and one of said wheels, a crank on the frame, and a driving connection between the crank and said wheel.

7. A device of the character described including a frame, wheels on the frame adapted to engage a cable-carrying strand, arms fixed to one end of the frame and extending above and below the engaging point of said wheels with the cable-carrying strand, a circular track carried on said arms, an arm extending from the frame and cooperating with the first named arms to support said track, a spinning head carried by said track, interengaged driving members connecting the spinning head and one of said wheels, a crank on the frame, a driving connection between the crank and said wheel, means associated with said arms for adjusting the track relative to the cable and carrying strand, and adjustable mounting means for one of said driving members to maintain interengagement of said member with its engaged member when the head is shifted by adjustment of the track.

8. In an apparatus of the character described, a lineman's car having a frame provided with wheel housings, wheels journalled in said housings and adapted to engage a cable-supporting strand, arms carried by one of said wheel housings and having ends extending above and below said housing respectively, slots in the ends of said arms, a laterally extending arm having adjustable support relative to said wheel housing, a circular track having fixed connection with said lateral arm, fastening devices extending through the slots of the first named arms to cooperate with the adjustable support of the lateral arm in adjusting the track relative to a cable supported by the strand engaged by said wheels, a spinning head carried by the track and rotatable about the axis of said cable, a driving connection between the spinning head and one of said wheels, a crank carried by said frame, and a driving connection between said crank and at least one of said wheels.

9. In an apparatus of the character described, a lineman's car having a frame provided with wheel housings, wheels journalled in said housings and adapted to engage a cable-supporting strand, arms carried by one of said wheel housings and having ends extending above and below said housing respectively, slots in the ends of said arms, a laterally extending arm having adjustable support relative to said wheel housing, a circular track having fixed connection with said lateral arm, fastening devices extending through the slots of the first named arms to cooperate with the adjustable support of the lateral arm in adjusting the track relative to a cable supported by the strand engaged by said wheels, a spinning head carried by the track and rotatable about the axis of said cable, a gear in said wheel housing having connection with the wheel therein, a gear on the spinning head, a counter-shaft, a bracket adjustably carrying the counter-shaft from the wheel housing, a gear on the counter-shaft meshing with the gear on the spinning head, a second gear on the counter-shaft meshing with the gear in said wheel housing, a crank carried by said frame, and a driving connection between said crank and at least one of said wheels.

DORY J. NEALE.